(12) United States Patent
Silva

(10) Patent No.: US 11,111,123 B2
(45) Date of Patent: Sep. 7, 2021

(54) LIFTING DEVICE AND RELATED METHODS

(71) Applicant: Christopher Silva, Houston, TX (US)

(72) Inventor: Christopher Silva, Houston, TX (US)

( * ) Notice: Subject to any disclaimer, the term of this patent is extended or adjusted under 35 U.S.C. 154(b) by 205 days.

(21) Appl. No.: 16/258,459

(22) Filed: Jan. 25, 2019

(65) Prior Publication Data
US 2020/0239294 A1  Jul. 30, 2020

(51) Int. Cl.
*B66F 11/00* (2006.01)
*B66F 13/00* (2006.01)

(52) U.S. Cl.
CPC .............. *B66F 11/00* (2013.01); *B66F 13/00* (2013.01)

(58) Field of Classification Search
CPC .. B66F 11/00; B66F 13/00; B65G 2201/0276; B65G 7/12; B66C 1/422; B66C 1/442
USPC .......................................... 294/114, 209, 210
See application file for complete search history.

(56) References Cited

U.S. PATENT DOCUMENTS

| | | |
|---|---|---|
| 695,528 A | 3/1902 | Beckley |
| 1,967,731 A * | 7/1934 | Ackerson ................ F25C 5/043 294/115 |
| 2,745,695 A | 5/1956 | Peyer |
| 2,817,548 A | 12/1957 | Uthemann |
| 3,239,243 A | 3/1966 | Grellsson |
| 3,404,427 A | 10/1968 | Mack |
| 3,451,711 A | 6/1969 | Carpenter |
| 3,948,552 A | 4/1976 | Hamrick |
| 4,114,464 A * | 9/1978 | Schubert .................. A61F 2/68 74/89.14 |
| 4,185,936 A | 1/1980 | Takahashi |
| 4,236,609 A | 12/1980 | Carlsson |
| 4,639,979 A | 2/1987 | Polson |
| 4,761,092 A | 8/1988 | Nakatani |
| 5,295,933 A | 3/1994 | Ciminski et al. |
| 5,409,280 A | 4/1995 | Hill |
| 6,508,496 B1 * | 1/2003 | Huang ...................... E01H 1/12 294/115 |
| 6,799,490 B1 | 10/2004 | Chu |
| 7,665,782 B2 * | 2/2010 | Buzby ................... E01H 1/1206 294/109 |
| 8,504,205 B2 * | 8/2013 | Summer ................ B25J 13/025 700/260 |
| 8,827,878 B1 | 9/2014 | Ciminski et al. |
| 9,073,732 B2 * | 7/2015 | LaValley .................. B26D 7/02 |
| 9,109,616 B1 | 8/2015 | Ballentine |
| 9,850,105 B1 * | 12/2017 | Schiller ................... B66C 1/442 |
| 10,118,299 B1 * | 11/2018 | Hudson .................. A01G 23/00 |
| 2001/0042625 A1 * | 11/2001 | Appleton .............. E21B 33/126 166/379 |
| 2004/0217612 A1 | 11/2004 | Slettedal |

(Continued)

*Primary Examiner* — Stephen A Vu
(74) *Attorney, Agent, or Firm* — Buche & Associates, P.C.; John K. Buche; Bryce A. Johnson

(57) ABSTRACT

Disclosed is a lifting device and related methods. The lifting device features a housing with at least two arms that each have engagement cams. The lifting device is placed over a tubular object and then the arms are pulled upwards until the engagement cams are in contact with the tubular object. Once in contact with the tubular object, the force from the arms creates a secure hold between the engagement cams and the object, whereby a user can lift the object and move it from one point to another safely and efficiently.

4 Claims, 5 Drawing Sheets

(56) References Cited

U.S. PATENT DOCUMENTS

| | | | |
|---|---|---|---|
| 2005/0126612 A1 | 6/2005 | Chen | |
| 2007/0251700 A1* | 11/2007 | Mason | E21B 19/06 |
| | | | 166/379 |
| 2008/0287271 A1 | 11/2008 | Jones | |
| 2009/0056930 A1* | 3/2009 | Angelle | E21B 19/08 |
| | | | 166/77.51 |
| 2012/0305041 A1 | 12/2012 | Lah et al. | |
| 2013/0307282 A1* | 11/2013 | Belder | B66C 1/44 |
| | | | 294/81.61 |

* cited by examiner

LIFTING DEVICE AND RELATED METHODS

CROSS-REFERENCE TO RELATED APPLICATIONS

Reserved for a later date, if necessary.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Generally, the manner in which one lifts and/or moves an object can determine whether they will experience present and/or future injury. As applied to machines, how an object is moved can determine the extent of maintenance required through the machine's lifetime as well as the length of the machine's life. As applied to individual users, handling hot or fragile objects by hand can pose a danger to the user and those nearby. As such, it is of paramount importance to properly balance safety and efficiency when determining how an object will be lifted and/or moved.

In this application, the disclosed device and method is pertinent to the oil and gas industry. Employees in this industry often work in dangerous conditions. Further, these workers tend to need to act quickly and efficiently, and especially in cases involving emergencies. In this and other similar industries, tubular objects may be too hot, cold, or toxic to lift and carry by hand. Moreover, individuals may risk safety by lifting these tubular objects with tools that are not intended for lifting tubular objects, such as pipe wrenches. Accordingly, there exists a need for an apparatus that allows a user to safely, securely, easily, and efficiently lift and carry tubular objects from one point to another.

SUMMARY OF THE INVENTION

In view of the foregoing, the disclosed subject matter relates to a lifting device and method of use for the lifting device, wherein the purpose of both is to facilitate lifting and moving objects safely and efficiently.

Another object of the invention is to provide a tubular lifting device comprised of at least two arms positioned diametrically opposite each other.

BRIEF DESCRIPTION OF THE DRAWINGS

Other objectives of the disclosure will become apparent to those skilled in the art once the invention has been shown and described. The manner in which these objectives and other desirable characteristics can be obtained is explained in the following description and attached figures in which.

It is to be noted, however, that the appended figures illustrate only one embodiment of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF THE INVENTION

Throughout the description, the following terms are used:
Housing 101;
Housing Stop 102;
First Arm Lodge 201;
First Arm 202;
First Engagement Cam 203;
Second Arm Lodge 301;
Second Arm 302;
Second Engagement Cam 303; and,
Fasteners 401; and,
Grips 501.

Disclosed is a lifting device and related methods. In a preferred embodiment, the disclosed invention allows a user to safely and efficiently lift and move objects from one point to another point. In one embodiment, the lifting device is designed for tubular objects in certain industries, such as the oil and gas industry, wherein handling of these objects by hand is difficult and/or dangerous.

Figure 1:
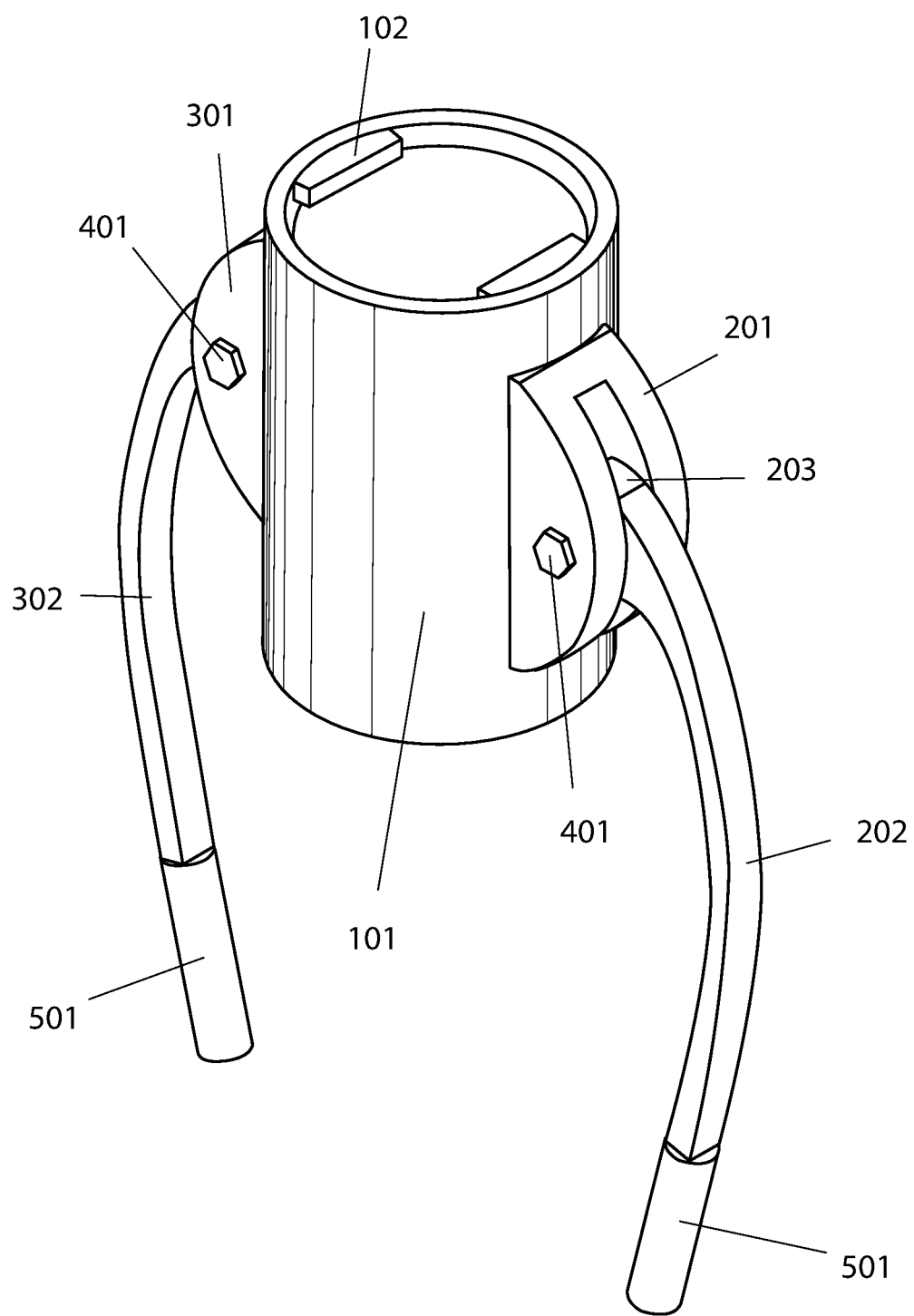
FIG. 1 is a perspective view of the lifting device.

FIG. 1 is a perspective view of the lifting device. Referring to FIG. 1, the lifting device may be defined by a housing 101 with a housing stop 102 at the top of the housing 101. The bottom of the housing 101 is open to receive an object. Still referring to FIG. 1, the housing 101 may also feature two arm lodges 201, 301 which are positioned on opposite sides of the housing 101. The first arm lodge 201 connects the first arm 202 to the housing 101 and the second arm lodge 302 connects the second arm 302 to the housing 101. In an alternative embodiment, the first arm 202 and second arm 302 may be connected directly to the housing 101, whereby the arm lodges 201, 301 are not necessary. Still referring to FIG. 1, the arms 202, 302 are connected to the arm lodges 201, 302 via fasteners 401, whereby the arms 202, 302 pivot or swivel around the fasteners 401. The first arm 201 has a first end with an engagement cam 203 and may have a second end with a grip 501. The second arm 301 also has a first end with an engagement cam 303 and may have a second end with a grip 501. The housing 101 is further defined by at least two slots 103 (see FIG. 2), which allow the engagement cams 203, 303 to enter the housing 101 and come into contact with an object that is placed within the housing 101.

Figure 2:
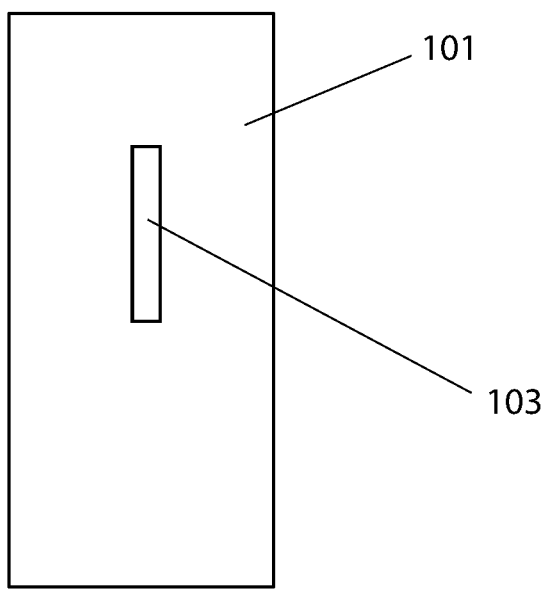
FIG. 2 is a side view of the housing of the lifting device.

FIG. 2 is a side view of the housing 101. Referring to FIG. 2, the housing 101 features at least two vertical slots 103 located on opposite sides of each other and at the same height on the housing 101.

Figure 3:
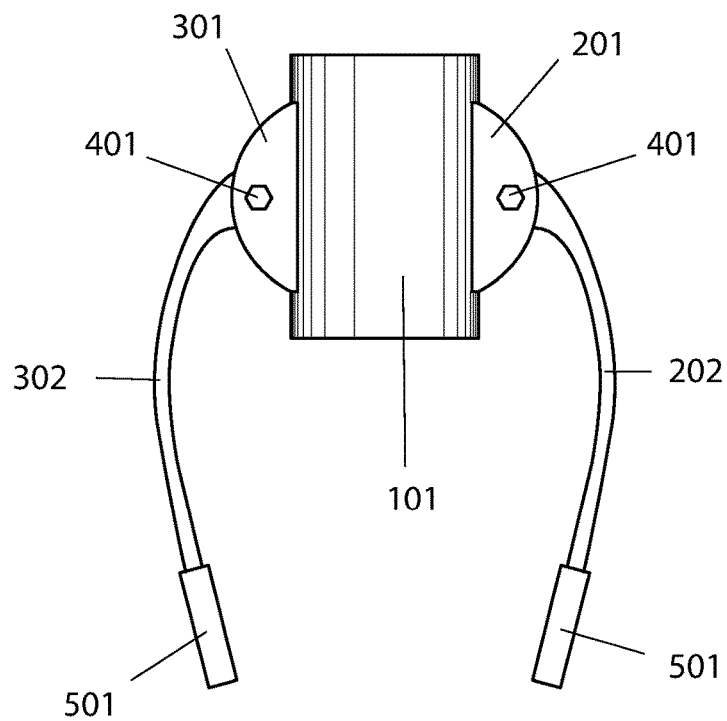
FIG. 3 is a front view of the lifting device with the arms in a disengaged position.

FIG. 3 is a front view of the lifting device with the arms 202, 302 in a resting position. When the arms 202, 302 are in a resting position, the engagement cams 203, 303 (see FIGS. 1, 5, 6) are not inside the housing 101, wherein the engagement cams 203, 303 do not impede any objects from being placed within the housing 101 and reaching the housing stops 102. This resting position allows a user to easily slide an object in and out of the housing 101.

Figure 4:
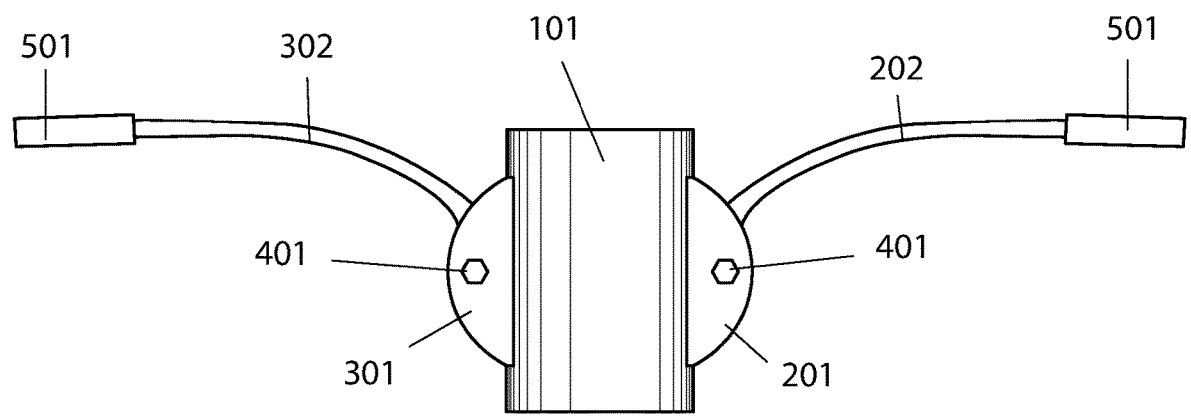
FIG. 4 is a front view of the lifting device with the arms in an engaged position.

FIG. 4 is a front view of the lifting device with the arms 202, 302 in an engaged position. In a preferred embodiment, the engaged position is when the arms are lifted up and the engagement cams 203, 303 enter the housing 101 and if there is an object within the housing 101, the engagement cams 203, 303 come into contact with the object. The engaged position allows a user to safely and efficiently lift an object within the housing 101 and transport it from one position to another position.

Figure 5:
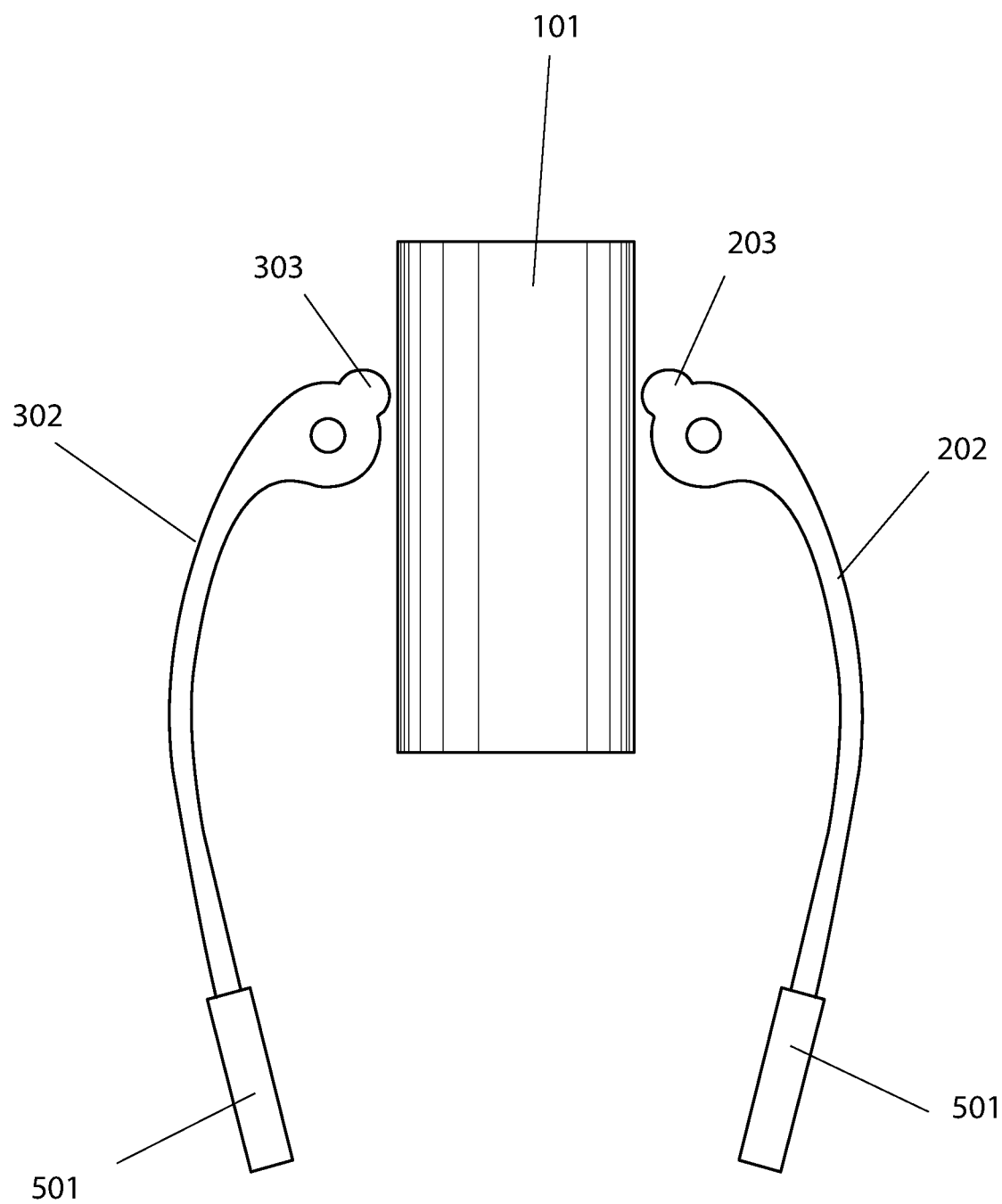
FIG. 5 is an exploded view of the lifting device; and,
FIG. 6 is an environmental view of the lifting device in use.

FIG. 5 is an exploded view of one embodiment of the lifting device. Referring to FIG. 5, the engagement cams 203, 303 are preferably located on the housing 101 side of the fastener 401 and the handle and grip 501 of the arms 202, 302 are located on the other side of the fastener 401. When a rotational force is applied to the handle in the upward direction, this configuration allows the engagement cams 203, 303 to rotate down and in toward the housing 101. In one embodiment, the engagement cams 203, 303 may feature teeth for enhanced gripping capabilities. The engagement cams 203, 303 may also be composed of tungsten carbide or other material with a similar hardness. In another embodiment, the engagement cams 203, 303 may composed of rubber, silicone rubber, or any other elastomer that provides friction when in contact with another surface and that does not damage the surface of an object. In one embodiment, the arms 202, 302 may be composed of a rigid plastic or metal.

Figure 6:
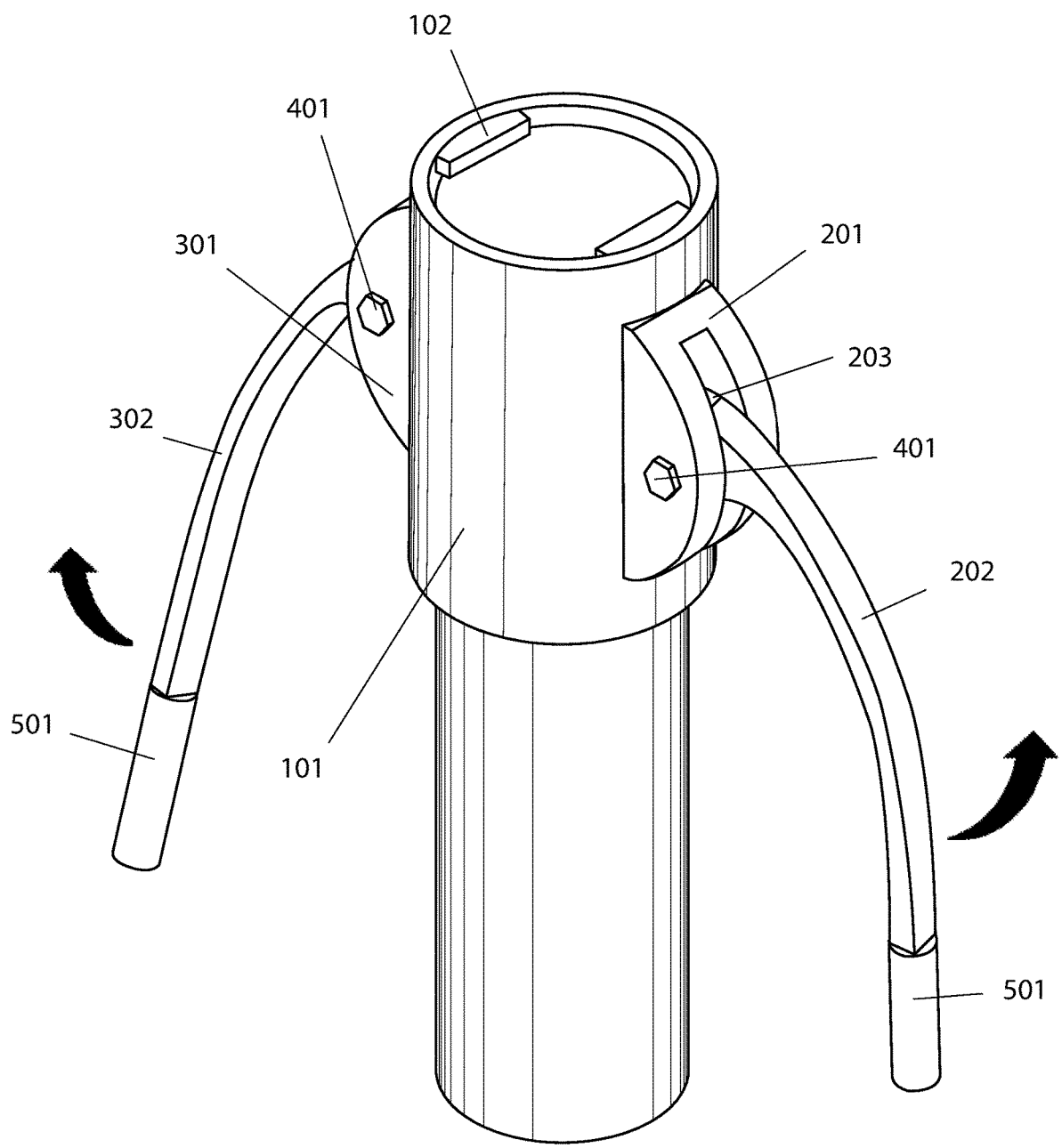

FIG. 6 is an environmental view of one embodiment of the lifting device. In use, a user places the housing 101 over an object until the object comes into contact with the housing stop 102. The user then grabs the arms 202, 302 and simultaneously pulls them up, whereby the engagement cams 203, 303 rotate down and inward toward the object in the housing 101. As the user pulls the arms 202, 302 up, the engagement comes into contact with the object within the housing 101 and the force on the arms from the user forces the engagement cams 202, 302 to grip and hold the object in place. Once the object is secured, the user holds the arms 202, 302 in place and moves the lifting device with the object from one point to another point.

In an alternative embodiment, the lifting device may be employed by a machine that automatically places the lifting device over an object, lifts the arms 202, 203, so that the engagement cams 203, 303 come into contact with the object and move the lifting device and object within it from one point to another point.

The housing 101 may be customized to be of different diameters to fit different tubular objects. Moreover the housing stop 102 may be a complete cover over the top of the housing 101.

Although the method and apparatus is described above in terms of one exemplary embodiment and implementation, it should be understood that the various features, aspects, and functionality described in the individual embodiment is not limited in applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiment.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases might be absent.

Additionally, the embodiment set forth herein is described in terms of exemplary block diagrams and other illustrations. As will become apparent to one of ordinary skill in the art after reading this document, the illustrated embodiment and its various alternatives might be implemented without confinement to the illustrated examples. For example, diagrams or figures and their accompanying description should not be construed as mandating a particular architecture or configuration.

All original claims submitted with this specification are incorporated by reference in their entirety as if fully set forth herein.

I claim:

1. A lifting device comprising:
    a tubular housing (101) with at least two slots (103) and two ends;
        wherein the tubular housing is open ended on one end that has received an object;
        wherein the tubular housing is partially open ended on another end, wherein the partially open ended end is further defined by a housing stop (102) that has stopped the object from travelling completely through the tubular housing (101);
    at least two arms (202, 302) that are fastened to the tubular housing (101), wherein the two arms (202, 302) have engagement cams (203, 303) and grips (501),
    wherein the engagement cams (203, 303) are rotatable in and out of the tubular housing (101) and wherein the engagement cams (203, 303) are situated in the tubular housing (101) so that the engagement cams (203, 303) are in contact with the tubular object and so that the arms (202, 302) oblique to an axis of the tubular body and the grips (501) disposed at a distal end of the arms (202, 302).

2. The device of claim 1, wherein the housing features a lodge secured to the outside of the housing, wherein the arms are fastened to the lodge.

3. A method of moving a tubular object comprising:

obtaining a lifting device comprising tubular housing (101) with at least two slots (103), wherein the tubular housing is open ended on one end to receive an object, wherein the tubular housing is partially open ended on another end, wherein the partially open ended end is further defined by a housing stop (102) configured to stop the object from travelling all the way through the tubular housing (101), at least two arms (202, 302) that are fastened to the tubular housing (101), wherein the two arms (202, 302) have engagement cams (203, 303) and grips (501), wherein the engagement cams (203, 303) are rotatable in and out of the tubular housing (101);

placing the open ended end of the tubular housing of the lifting device over the tubular object;

gripping the grips (501) of the two arms (202,302) and then pulling the arms (202, 302) of the lifting device upward until the engagement cams (203, 303) come into contact with the tubular object and apply a pressing force on the object;

gripping the grips (501) of the two arms (202,302) and then lifting the lifting device while the tubular object is retained within the tubular housing via the pressing force applied to the object;

moving while lifted said lifting device and tubular object to a desired destination; and setting said lifting device and tubular object at the desired destination;

gripping the grips (501) of the two arms (202,302) and then releasing the arms (202, 302) back down until the engagement cams (203, 303) come out of contact with the tubular object.

4. The method of claim 3, wherein the housing features a lodge secured to the outside of the housing, wherein the arms are fastened to the lodge.

* * * * *